(12) United States Patent
Mickle

(10) Patent No.: US 8,714,108 B1
(45) Date of Patent: May 6, 2014

(54) LITTER BOX ENCLOSURE ASSEMBLY AND METHOD

(76) Inventor: Tom J. Mickle, Fernandina Beach, FL (US)

( * ) Notice: Subject to any disclaimer, the term of this patent is extended or adjusted under 35 U.S.C. 154(b) by 113 days.

(21) Appl. No.: 13/340,628

(22) Filed: Dec. 29, 2011

(51) Int. Cl.
*A01K 29/00* (2006.01)

(52) U.S. Cl.
USPC .......................................... 119/165; 119/484

(58) Field of Classification Search
USPC ................................................. 119/165, 484
See application file for complete search history.

(56) References Cited

U.S. PATENT DOCUMENTS

| | | | | |
|---|---|---|---|---|
| 3,738,322 A * | 6/1973 | Smith | ........................... | 119/484 |
| 4,021,975 A | 5/1977 | Calkins | | |
| 4,224,899 A * | 9/1980 | Cruchelow et al. | ........... | 119/501 |
| 4,291,645 A * | 9/1981 | Cruchelow et al. | ........... | 119/484 |
| 5,148,767 A * | 9/1992 | Torchio | ......................... | 119/484 |
| D330,274 S * | 10/1992 | Smith et al. | .................. | D30/108 |
| 5,165,366 A * | 11/1992 | Harvey | .......................... | 119/165 |
| 5,167,202 A | 12/1992 | Bradford et al. | | |
| 5,195,457 A * | 3/1993 | Namanny | ...................... | 119/484 |
| 5,261,350 A | 11/1993 | Vavrek | | |
| 5,522,344 A * | 6/1996 | Demurjian | .................... | 119/474 |
| 5,649,500 A | 7/1997 | Klavemann et al. | | |
| 6,439,161 B1 * | 8/2002 | Clemmons | .................... | 119/165 |
| 7,530,331 B1 * | 5/2009 | Malachowski | ................ | 119/484 |
| D613,910 S | 4/2010 | Clemmons et al. | | |

* cited by examiner

*Primary Examiner* — Kristen C Hayes

(57) ABSTRACT

A litter box enclosure assembly provides a method for diminishing litter box odor within a dwelling space. The assembly includes a dwelling space having an outer wall. The outer wall has an interior surface and an exterior surface. An enclosure has a sidewall positioned adjacent to the exterior surface of the outer wall defining an enclosed interior space. A top of the enclosure has a perimeter edge positioned adjacent to a top edge of the sidewall. The top also has an outer edge abutting the exterior surface of the outer wall whereby the interior space is configured for holding an animal within the interior space. A litter box is positioned in the interior space. An opening is positioned in the outer wall. The opening extends between the dwelling space and the interior space. A door is coupled to the outer wall selectively covering the opening in the outer wall.

9 Claims, 4 Drawing Sheets

LITTER BOX ENCLOSURE ASSEMBLY AND METHOD

BACKGROUND OF THE DISCLOSURE

Field of the Disclosure

The disclosure relates to litter box devices and more particularly pertains to a new litter box device for positioning a litter box in an enclosure within a pet accessible attached garage space to diminish litter box odor within a dwelling.

SUMMARY OF THE DISCLOSURE

An embodiment of the disclosure meets the needs presented above by generally comprising a dwelling space having an outer wall. The outer wall has an interior surface and an exterior surface. An enclosure has a sidewall having spaced free ends positioned adjacent to the exterior surface of the outer wall defining an enclosed interior space. A top of the enclosure has a perimeter edge positioned adjacent to a top edge of the sidewall. The top also has an outer edge abutting the exterior surface of the outer wall whereby the interior space is configured for holding an animal within the interior space. A litter box is positioned in the interior space. An opening is positioned in the outer wall. The opening extends between the dwelling space and the interior space. A door is coupled to the outer wall selectively covering the opening in the outer wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
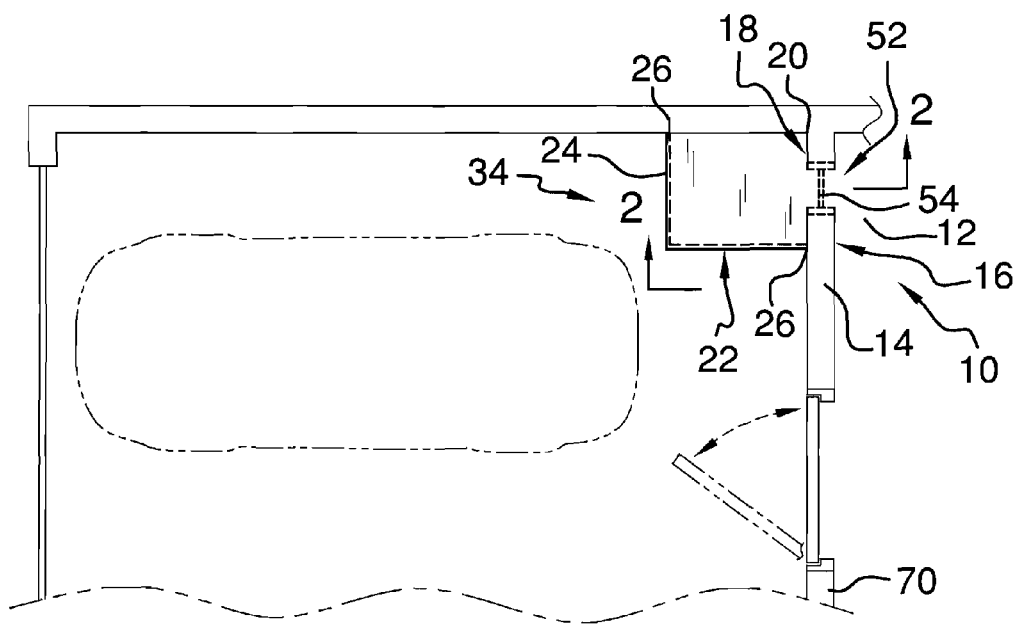
FIG. 1 is a top view of a litter box enclosure assembly and method according to an embodiment of the disclosure.
Figure 2:
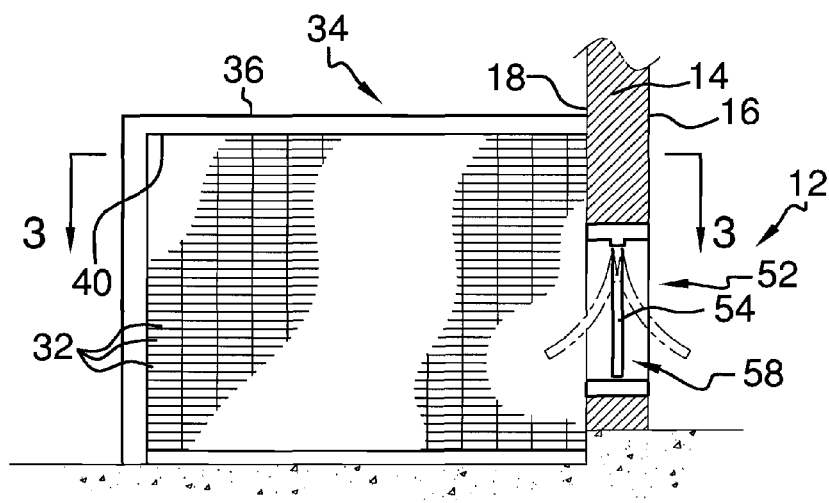
FIG. 2 is a partial cut-away front view of an embodiment of the disclosure.
Figure 3:
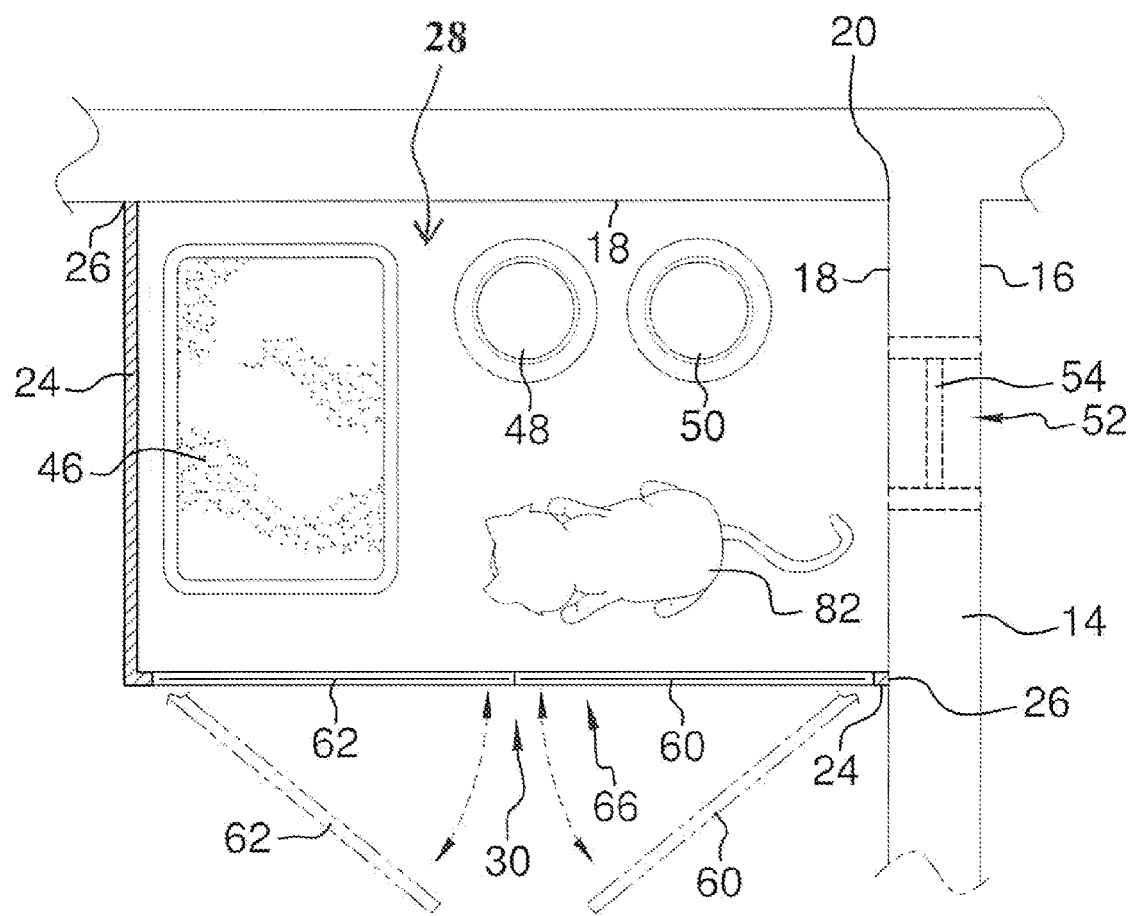
FIG. 3 is a cross-sectional view of an embodiment of the disclosure taken along line 3-3 of FIG. 2.
Figure 5:
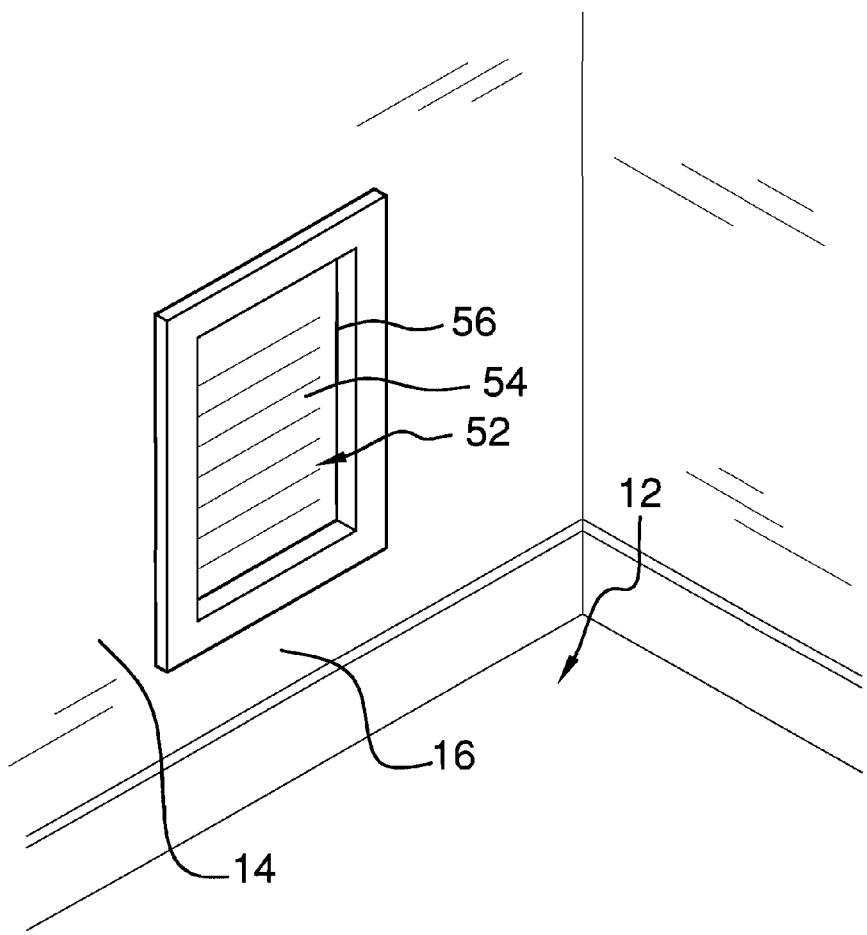
FIG. 5 is a top front side perspective view of an embodiment of the disclosure from inside a dwelling space.
Figure 4:
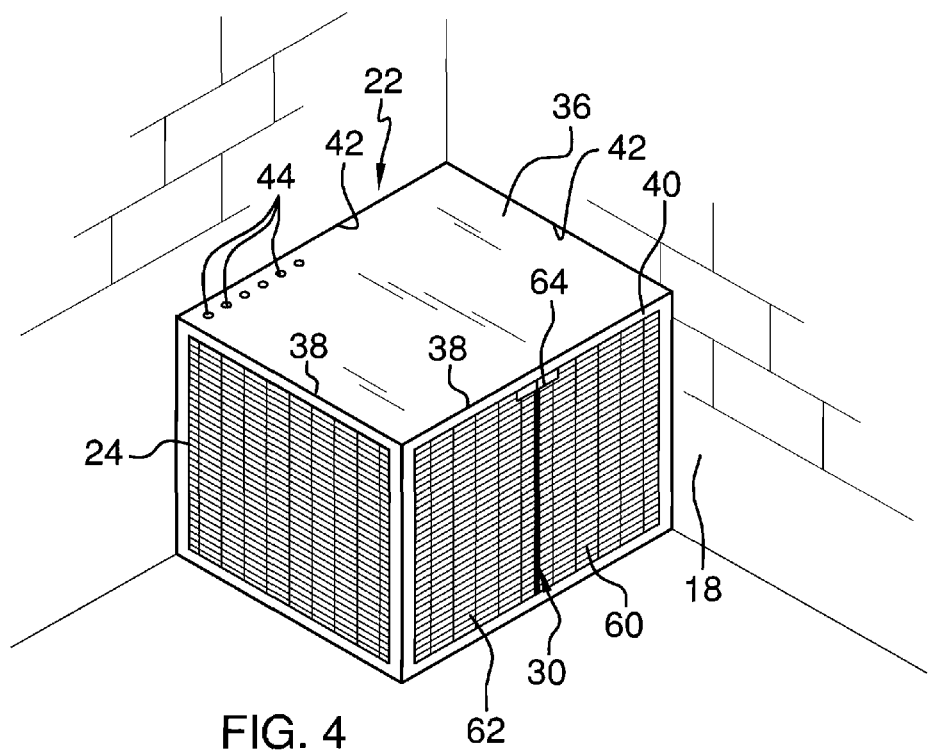
FIG. 4 is a top front side perspective view of an embodiment of the disclosure from outside a dwelling space.
Figure 6:
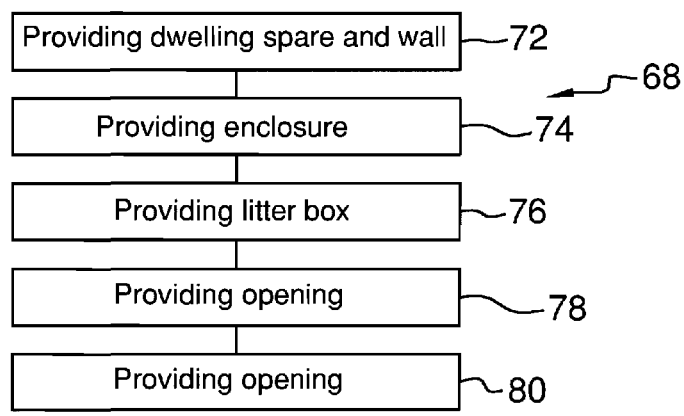
FIG. 6 is a schematic view of an embodiment of the disclosure.

With reference now to the drawings, and in particular to FIGS. 1 through 6 thereof, a new litter box device embodying the principles and concepts of an embodiment of the disclosure and generally designated by the reference numeral 10 will be described.

As best illustrated in FIGS. 1 through 6, the litter box enclosure assembly 10 generally comprises a dwelling space 12 having an outer wall 14. The exterior wall 14 has an interior surface 16 and an exterior surface 18 relative to the dwelling space 12. The exterior surface 18 may be planar or extend around a corner 20. An enclosure 22 has a sidewall 24 having spaced free ends 26 positioned adjacent to the exterior surface 18 of the outer wall 14. The sidewall 24 and outer wall 14 define an enclosed interior space 28. The sidewall 24 may have an aperture 30 configured for facilitating access to the interior space 28. The sidewall 24 may further have a plurality of sidewall vents 32 whereby the interior space 28 is in fluid communication with ambient space 34 surrounding the sidewall 24 to diminish odor within the interior space 28.

A top 36 of the enclosure 22 has a perimeter edge 38 positioned adjacent to a top edge 40 of the sidewall 24. The top 36 also has an outer edge 42 abutting the exterior surface 18 of the outer wall 14. Thus, the interior space 28 is configured for holding an animal 42 within the interior space 28. The top 36 of the enclosure 22 may have a plurality of spaces 44 such that the interior space 28 is also in fluid communication with ambient space 34 surrounding the enclosure 22 through the top 36. A litter box 46 is positioned in the interior space 28. An opening 52 is positioned in the outer wall 14. The opening 14 extends between the dwelling space 12 and the interior space 28. A door 54 is coupled to the outer wall 14. The door 54 selectively covers the opening 52 in the outer wall 14. The door has an outer perimeter edge 56 abutting the outer wall 14 around the opening 52 when the door 54 is in a closed position 58. Thus, the door 54 inhibits odors from passing into the dwelling space 12 from the interior space 28 through the opening 52.

Additional items including but not limited to a food dish 48 and water dish 50 may also be placed in the interior space 28 if desired. A first screen 60 may be coupled to the sidewall 24. The first screen 60 is positioned in the aperture 30 in the sidewall 24. A second screen 62 may also be coupled to the sidewall 24 and positioned adjacent to the first screen 60. Each of the first screen 60 and the second screen 62 is pivotally coupled to the sidewall 24 for selectively providing access to the interior space 28 through the aperture 30 in the sidewall 24. Alternatively, a single screen could be utilized. A latch 64 may be coupled to the first screen 60 and the second screen 62. The latch 64 selectively holds the first screen 60 and the second screen 62 in a closed position 66.

In use, the assembly 10 provides for a method 68 of diminishing litter box odor within a dwelling 70. A first step 72 of the method 68 is providing the dwelling space 12 having the outer wall 14. An additional step 74 is providing the enclosure 22 abutting the exterior surface 18 of the outer wall 14 to define the enclosed interior space 28 of the enclosure 22. Yet another step 76 is positioning the litter box 46 in the interior space 28. A further step 78 is providing the opening 52 in the outer wall 14 extending between the dwelling space 12 and the interior space 28. Yet another step 80 is providing the door 54 coupled to the outer wall 14 as described above such that the animal 42 has free access to the litter box 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A litter box enclosure assembly comprising:
a dwelling space having an outer wall, said exterior wall having an interior surface and an exterior surface;
an enclosure having a sidewall, said sidewall having spaced free ends positioned adjacent to said exterior surface of said outer wall defining an enclosed interior space;
a top of said enclosure having a perimeter edge positioned adjacent to a top edge of said sidewall, said top having an outer edge abutting said exterior surface of said outer wall whereby said interior space is configured for holding an animal within said interior space;
a litter box positioned in said interior space;
an opening positioned in said outer wall, said opening extending between said dwelling space and said interior space; and
a door coupled to said outer wall, said door selectively covering said opening in said outer wall, said door being movable into and out of said interior space by pushing against said door wherein said door is configured to permit the animal to freely enter and exit said interior space.

2. The assembly of claim 1, further including said door having an outer perimeter edge abutting said outer wall when said door is in a closed position whereby said door is configured for inhibiting odors from passing into said dwelling space from said interior space.

3. The assembly of claim 1, further including said sidewall having a plurality of sidewall vents whereby said interior space is in fluid communication with ambient space surrounding said sidewall.

4. The assembly of claim 1, further including said top of said enclosure having a plurality of spaces whereby said interior space is in fluid communication with ambient space surrounding said sidewall.

5. The assembly of claim 1, further including
said sidewall having an aperture configured for facilitating access to said interior space; and
a first screen coupled to said sidewall, said first screen being positioned in said aperture in said sidewall.

6. The assembly of claim 5, further including a second screen coupled to said sidewall, said second screen being positioned adjacent to said first screen.

7. The assembly of claim 6, further including each of said first screen and said second screen being pivotally coupled to said sidewall for selectively providing access to said interior space through said aperture in said sidewall.

8. The assembly of claim 6, further including a latch coupled to said first screen and said second screen, said latch selectively holding said first screen and said second screen in a closed position.

9. A litter box enclosure assembly comprising:
a dwelling space having an outer wall, said exterior wall having an interior surface and an exterior surface;
an enclosure having a sidewall, said sidewall having spaced free ends positioned adjacent to said exterior surface of said outer wall defining an enclosed interior space, said sidewall having an aperture configured for facilitating access to said interior space, said sidewall having a plurality of sidewall vents whereby said interior space is in fluid communication with ambient space surrounding said sidewall;
a top of said enclosure having a perimeter edge positioned adjacent to a top edge of said sidewall, said top having an outer edge abutting said exterior surface of said outer wall whereby said interior space is configured for holding an animal within said interior space, said top of said enclosure having a plurality of spaces whereby said interior space is in fluid communication with ambient space surrounding said sidewall;
a litter box positioned in said interior space;
an opening positioned in said outer wall, said opening extending between said dwelling space and said interior space;
a door coupled to said outer wall, said door selectively covering said opening in said outer wall, said door having an outer perimeter edge abutting said outer wall when said door is in a closed position whereby said door is configured for inhibiting odors from passing into said dwelling space from said interior space, said door being movable into and out of said interior space by pushing against said door wherein said door is configured to permit the animal to freely enter and exit said interior space;
a first screen coupled to said sidewall, said first screen being positioned in said aperture in said sidewall;
a second screen coupled to said sidewall, said second screen being positioned adjacent to said first screen, each of said first screen and said second screen being pivotally coupled to said sidewall for selectively providing access to said interior space through said aperture in said sidewall; and
a latch coupled to said first screen and said second screen, said latch selectively holding said first screen and said second screen in a closed position.

* * * * *